United States Patent
Srivastava et al.

(10) Patent No.: US 8,484,217 B1
(45) Date of Patent: Jul. 9, 2013

(54) KNOWLEDGE DISCOVERY APPLIANCE

(75) Inventors: Manoj Kumar Srivastava, Reston, VA (US); William Andrews Walker, Springfield, VA (US); Eric Alexander Olson, Alexandria, VA (US); Steven Robert Smith, Vienna, VA (US)

(73) Assignee: QINETIQ North America, Inc., McLean, VA (US)

( * ) Notice: Subject to any disclaimer, the term of this patent is extended or adjusted under 35 U.S.C. 154(b) by 152 days.

(21) Appl. No.: 13/045,028

(22) Filed: Mar. 10, 2011

(51) Int. Cl.
*G06F 7/00* (2006.01)
*G06F 17/30* (2006.01)

(52) U.S. Cl.
USPC ............................ 707/738; 707/748; 707/754

(58) Field of Classification Search
USPC .................. 707/737, 738, 754, 748
See application file for complete search history.

(56) References Cited

U.S. PATENT DOCUMENTS

| | | | |
|---|---|---|---|
| 7,904,319 B1 * | 3/2011 | Whear et al. ........................ 705/4 |
| 7,912,865 B2 * | 3/2011 | Akerman et al. ............. 707/802 |
| 2003/0004928 A1 * | 1/2003 | Inaba et al. ........................ 707/1 |
| 2003/0154212 A1 * | 8/2003 | Schirmer et al. ........... 707/103 R |
| 2003/0212989 A1 * | 11/2003 | Rokosz .......................... 717/135 |
| 2004/0236721 A1 * | 11/2004 | Pollack et al. ..................... 707/2 |
| 2006/0168014 A1 * | 7/2006 | Wang ............................ 709/206 |
| 2008/0162643 A1 * | 7/2008 | Flach ............................ 709/206 |
| 2011/0055332 A1 * | 3/2011 | Stein ............................ 709/206 |
| 2012/0013805 A1 * | 1/2012 | Mihara et al. ................. 348/569 |

* cited by examiner

*Primary Examiner* — Phong Nguyen
(74) *Attorney, Agent, or Firm* — Finnegan, Henderson, Farabow, Garrett & Dunner, LLP

(57) ABSTRACT

Methods and systems for collecting and processing large volumes of data to determine the relevancy and value thereof comprise: deploying one or more data retrieval modules to interface with one or more data sources within the local network, wherein the one or more data retrieval modules comprise executable program code; executing the one or more data retrieval modules to perform operations comprising: accessing application data representing data stored or communicated through the one or more data sources; and forwarding the application data for analysis; and analyzing the forwarded application data to determine whether it is relevant to the topic, wherein the analyzing is performed by one or more devices within the local network.

21 Claims, 15 Drawing Sheets

| Subject | Author | Date | Replies |
|---|---|---|---|
| Memory leak in Customer_Purchase_Trxs batch process???? | J. Brumley | May 5, 2010 | 5 |
| Network down - be up 5-10 minutes | K. Morris | May 11, 2010 | 14 |
| I hate Java Struts! | M. Jitandra | June 13, 2010 | 3 |
| Can anyone tell me why this code is not compiling? | K. Thompson | July 5, 2010 | 8 |
| Design Meeting on Monday at 10:00 AM | Y. Chang | Aug. 28, 2010 | 0 |
| Another one bites the dust | D. Freedman | Sep. 9, 2010 | 27 |

500

510 — It's official (although not public yet). I overheard Mike Davis and a few other execs in the cafe today saying that the board and Microsoft have reached a deal. MS to buy the company for $334m at $70/share. Davis said there would be a press release on Friday.

Re: Another one bites the dust

Re: Another one bites the dust

520 — $70/share?! What's it trading @ now, like $53? Time to buy some more stock. Are you sure they said Friday?

Re: Another one bites the dust — P. Cassius — Sep. 10, 2010 — 4

Re: Another one bites the dust

Fig. 5

```xml
<?xml version="1.0" encoding="UTF-8"?>
<?xml-stylesheet type="text/xsl" href="/~d/styles/gen_feed.xsl"?>

<data_item>
    <payload>
        <message_thread>
            <post id="3559" parent="null">
                <head>"Another one bites the dust"; "D. Freedman"; "Sep. 9, 2010"; "5 Replies"</head>
                <body>It's official (although not public yet). I overheard Mike Davis and a few other execs in the café today saying that the board and Microsoft have reached a deal. MS to buy the company for $334m at $70/share. Davis said there would be a press release on Friday.</body>
            </post>
            ...
            <post id="3562" parent="3559">
                <head>"Re: Another one bites the dust"; "P. Cassius"; Sep. 10, 2010"; "4 Replies"</head>
                <body>$70/share?! What's it trading @ now, like $53? Time to buy some more stock. Are you sure they said Friday?</body>
            </post>
        </message_thread>
    </payload>
</data_item>
```

Fig. 8a

```xml
<?xml version="1.0" encoding="UTF-8"?>
<?xml-stylesheet type="text/xsl" href="/~d/styles/gen_doc.xsl"?>

<data_item>
    <payload>
        <document>
            <head>"The Expanding Role of Mid-Level Management in Preventing Insider Trading"; "Roland S. McAffee"; "August 22, 2001"; "Harvard Business Review"</head>
            <body>Conventional wisdom has held that preventing insider trading starts and ends with the CFO. However, research finds that, in 72% of SEC-prosecuted insider trading cases, the original information leak occurred within mid-level management. This evidence, coupled with recent trends in the use of unsecured email to discuss defensive measures against hostile takeovers, suggests that new procedures that start with mid-level management may be needed in most Fortune 500 companies. . . . </body>
            <footnote>Associate Professor, Wharton School of Management; former technology lead at Microsoft Corp.</footnote>
        </document>
    </payload>
</data_item>
```

Fig. 8b

```xml
<?xml version="1.0" encoding="UTF-8"?>
<?xml-stylesheet type="text/xsl" href="/~d/styles/gen_feed.xsl"?>
<data_item>                    1110
    <metadata>
         <initial_attributes>              1121
1120          <date>2010-09-09</date>
              <date>2010-10-09</date>  1122
              <title>Another one bites the dust</title>  1123
              <source-type>Message board</source-type>  1124
              <source-name>Sys Admin Message Board</source-name>  1125
              <author>Freedman, Darren</author>  1126
              <author>Cassius, Peter</author>  1127
              <custodian>Sys Admin Working Group</custodian>  1128
         </initial_attributes>
    </metadata>
    <payload>
         <thread>
              <post id="3559" parent="null">
                   <head>"Another one bites the dust"; "D. Freedman"; "Sep. 9, 2010"; "5 Replies"</head>
                   <body>It's official (although not public yet). I overheard Mike Davis and a few other execs in the café today saying that the board and Microsoft have reached a deal. MS to buy the company for $334m at $70/share. Davis said there would be a press release on Friday.</body>
              </post>
              ...
              <post id="3562" parent="3559">
                   <head>"Re: Another one bites the dust"; "P. Cassius"; Sep. 10, 2010"; "4 Replies"</head>
                   <body>$70/share?! What's it trading @ now, like $53? Time to buy some more stock. Are you sure they said Friday?</body>
              </post>
         </thread>
    </payload>
</data_item>
```

Fig. 11

```
<?xml version="1.0" encoding="UTF-8"?>
<?xml-stylesheet type="text/xsl" href="/~d/styles/gen_feed.xsl"?>

<data_item>                1210
    <metadata>
        <initial_attributes>                                            1222
1220          <date>null</date>    1221
            <title>The Expanding Role of Mid-Level Management in Preventing Insider Trading</title>
            <source-type>Journal, Academic</source-type>  1223
            <source-name>Harvard Business Review</source-name>  1224
            <author>McAffee, Roland S.</author>  1225
            <custodian>Davis, Michael E.</custodian>  1226
        </initial_attributes>
    </metadata>
    <payload>
        <document>
            <head>"The Expanding Role of Mid-Level Management in Preventing Insider Trading"; "Roland S. McAffee"; "August 22, 2001"; "Harvard Business Review"</head>
            <body>Conventional wisdom has held that preventing insider trading starts and ends with the CFO.  However, research finds that, in 72% of SEC-prosecuted insider trading cases, the original information leak occurred within mid-level management.  This evidence, coupled with recent trends in the use of unsecured email to discuss defensive measures against hostile takeovers, suggests that new procedures that start with mid-level management may be needed in most Fortune 500 companies. . .
            </body>
            <footnote>Associate Professor, Wharton School of Management; former technology lead at Microsoft Corp.</footnote>
        </document>
    </payload>
</data_item>
```

Fig. 12

```xml
<?xml version="1.0" encoding="UTF-8"?>
<?xml-stylesheet type="text/xsl" href="/~d/styles/gen_feed.xsl"?>
<data_item>
    <metadata>
        <initial_attributes>
            <date>2010-09-09</date>
            <date>2010-10-09</date>
            <title>Another one bites the dust</title>
            <source-type>Message board</source-type>
            <source-name>Sys Admin Message Board</source-name>
            <author>Freedman, Darren</author>
            <author>Cassius, Peter</author>
            <custodian>Sys Admin Working Group</custodian>
        </initial_attributes>
        <derived_attributes>
            <kw:share>3</kw:share>
            <kw:deal>1</kw:deal>
            <kw:takeover>0</kw:takeover>
            <kw:microsoft>1</kw:microsoft>
            <kw:ms>1</kw:ms>
            <bool:inside_5_trade>0</bool:inside_5_trade>
            <rule:mentions_exec>F3</kw:mentions_exec>
        </derived_attributes>
    </metadata>
    <payload>
        <thread>
            <post id="3559" parent="null">
                <head>"Another one bites the dust"; "D. Freedman"; "Sep. 9, 2010"; "5 Replies"</head>
                <body>It's official (although not public yet). I overheard Mike Davis and a few other execs in the café today saying that the board and Microsoft have reached a deal. MS to buy the company for $334m at $70/share. Davis said there would be a press release on Friday.</body>
            </post>
            ...
            <post id="3562" parent="3559">
                <head>"Re: Another one bites the dust"; "P. Cassius"; Sep. 10, 2010"; "4 Replies"</head>
                <body>$70/share?! What's it trading @ now, like $53? Time to buy some more stock. Are you sure they said Friday?</body>
            </post>
        </thread>
    </payload>
</data_item>
```

Fig. 13

```xml
<?xml version="1.0" encoding="UTF-8"?>
<?xml-stylesheet type="text/xsl" href="/~d/styles/gen_feed.xsl"?>
<data_item>                                              1400
    <metadata>  1210
        <initial_attributes>
1220            <date>null</date>
            <title>The Expanding Role of Mid-Level Management in Preventing Insider Trading</title>
            <source-type>Journal, Academic</source-type>
            <source-name>Harvard Business Review</source-name>
            <author>McAffee, Roland S.</author>
            <custodian>Davis, Michael E.</custodian>
        </initial_attributes>
        <derived_attributes>
1430        <kw:share>16</kw:share>   1431
            <kw:deal>13</kw:deal>  1432
            <kw:takeover>10</kw:takeover>  1433
            <kw:microsoft>2</kw:microsoft>  1434
            <kw:ms>2</kw:ms>  1435
            <bool:inside_5_trade>1</bool:inside_5_trade>  1436
            <rule:mentions_exec>0A</kw:mentions_exec>  1437
        </derived_attributes>
    </metadata>
    <payload>
        <document>
            <head>"The Expanding Role of Mid-Level Management in Preventing Insider Trading"; "Roland S. McAffee"; "August 22, 2001"; "Harvard Business Review"</head>
            <body>Conventional wisdom has held that preventing insider trading starts and ends with the CFO. However, research finds that, in 72% of SEC-prosecuted insider trading cases, the original information leak occurred within mid-level management. This evidence, coupled with recent trends in the use of unsecured email to discuss defensive measures against hostile takeovers, suggests that new procedures that start with mid-level management may be needed in most Fortune 500 companies. . . </body>
            <footnote>Associate Professor, Wharton School of Management; former technology lead at Microsoft Corp.</footnote>
        </document>
    </payload>
</data_item>
```

Fig. 14

KNOWLEDGE DISCOVERY APPLIANCE

TECHNICAL FIELD

The present disclosure relates generally to methods and systems for collecting and processing large volumes of data to determine the relevancy and value thereof.

BACKGROUND

Experts tasked with analyzing large pools of data on a routine basis often find themselves overwhelmed by the volume, format, sources, and content of the data they must process. In a typical scenario, events and incidents are identified by analysts through human analysis and piecemeal processing of data from tools such as search engines or medium-specific applications. This process is slow at best, and can miss many relevant data points simply due to the overwhelming volume of data available for a given event or trend. Two problems in particular commonly plague the analysis process: data heterogeneity and data overload.

The problem of data heterogeneity arises when data from multiple sources must be analyzed, each source utilizing a different data format or organizational scheme. For example, in the world of law enforcement, information analysts receive data from a large variety of sources. The data may be structured or unstructured and may be in a wide variety of file formats, such as documents, web pages, databases, data feeds, police reports, etc. Although individual law enforcement data centers may be able to process data from individual sources, it may be difficult to draw useful inferences or conclusions across multiple heterogeneous sources. For example, search tools may need to be separately configured for each individual data source in order to cull only the relevant materials from the data source.

In response to the problem of data heterogeneity, analysts have traditionally employed what is broadly known as a "collect and search" process. The collect and search process attempts to avoid the need to tailor individual search tools for each individual data source by simply collecting all available data from all data sources, whether relevant or not, and then conducting searches across the collected data to determine relevancy after the fact.

However, the simple collect and search process often results in the second common problem, i.e., data overload. First, the failure to make relevancy determinations during the collection process (a necessary byproduct of the decision not to employ data source-specific search tools during the collection process) often results in enormous amounts of data that must be stored, placing burdens on system memory. Second, the system must also search across the entire collection of stored data, most of which may not be relevant to the topic of the search. Not only does the overinclusiveness of the stored data place large burdens on search system performance, but it may result in large numbers of irrelevant data items being included in search results, placing a burden on human analysts to try to separate useful search results from statistical noise.

One variation on the traditional collect and search process is to index the data as it is being collected. Such indexing allows analysts to run searches on the indexed data to locate relevant information rather than over the entire raw data set. However, this approach becomes problematic when applied to large volumes of data. Creating an index both increases latency and requires considerable disk space to store the index. Furthermore, the effectiveness of the search is limited to the content or keywords appearing in the index, which necessarily excludes large portions of the content. Finally, because indexing may capture non-relevant data items just as easily as raw searching over non-indexed data, indexing may do little to eliminate the number of non-relevant search results, thus failing to relieve the burden placed on human analysts.

There is therefore a need for methods and systems for searching large volumes of data in near real-time that overcome the foregoing problems, among others.

SUMMARY OF THE INVENTION

The present invention comprises systems and methods for analyzing data in a network to determine relevance. Embodiments of the present invention collect and analyze large volumes of data from numerous, potentially heterogeneous, sources using processes that standardize data formats and make initial relevancy determinations as part of the collection process. Certain embodiments are deployable at a user site, in order to ensure that all data collection and analysis is performed within the confines of the network, and are meant to complement existing technologies present within an organization's network. Processing may be done in real-time using an iterative learning engine that evaluates content based on attributes to determine the relevancy of data. Material in any language may be processed, as well as both structured, semi-structured and unstructured data from a wide variety of file formats. This approach significantly improves the relevancy and accuracy of identified events while dramatically reducing the time and memory demands typically associated with processing large volumes of data.

Although those skilled in the art will appreciate many different applications of the disclosed invention, some embodiments of the invention may be used to accomplish three common tasks typically associated with organizations such as businesses or governmental entities. In collecting and analyzing data processed or stored within an internal network, such as a corporate intranet, embodiments of the invention may be used to (1) ensure compliance, (2) facilitate intelligence, and (3) ensure protection of intellectual property.

Ensuring compliance may involve analyzing company data and intra-organization communications to ensure that applicable laws, regulations, company policies, or other rules are not being violated within the organization. For example, a company may wish to ensure that secret corporate decisions are not being leaked to inappropriate sources within the company or that information is not being used for insider trading transactions or money laundering. Intelligence may involve a similar focus on data stored within the organization; however, that data might first be collected from outside sources and might pertain to extra-company information, which may be used to draw useful conclusions about events or subjects outside of the company, such as national security or business marketing analysis. Finally, intellectual property protection may involve monitoring data, such as communications entering and/or leaving the organization, to ensure that intellectual property, such as business plans or technological research and development, is not being misappropriated.

Those skilled in the art will appreciate that these functions are for purposes of illustration only and may be considered fluid. For example, ensuring that the details of a new product are kept secret might be considered both a compliance and an intellectual property issue, since it may involve both ensuring that information is not leaked within the company (e.g., outside of an engineering or research development group) and that information does not leave the company.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings:

FIG. 5 is a diagram depicting an exemplary electronic message board containing internal communications, consistent with certain disclosed embodiments;

FIG. 8a is a diagram depicting an exemplary normalized format for data captured from the electronic message board of FIG. 5, consistent with certain disclosed embodiments;

FIG. 8b is a diagram depicting an exemplary normalized format for data captured from the digital document of FIG. 6, consistent with certain disclosed embodiments;

FIG. 11 is a diagram depicting the data of FIG. 8a after attaching a set of initial attributes, consistent with certain disclosed embodiments;

FIG. 12 is a diagram depicting the data of FIG. 8b after attaching a set of initial attributes, consistent with certain disclosed embodiments;

FIG. 13 is a diagram depicting the data of FIG. 11 after further enrichment, consistent with certain disclosed embodiments;

FIG. 14 is a diagram depicting the data of FIG. 12 after further enrichment, consistent with certain disclosed embodiments.

DETAILED DESCRIPTION OF THE INVENTION

Figure 1:
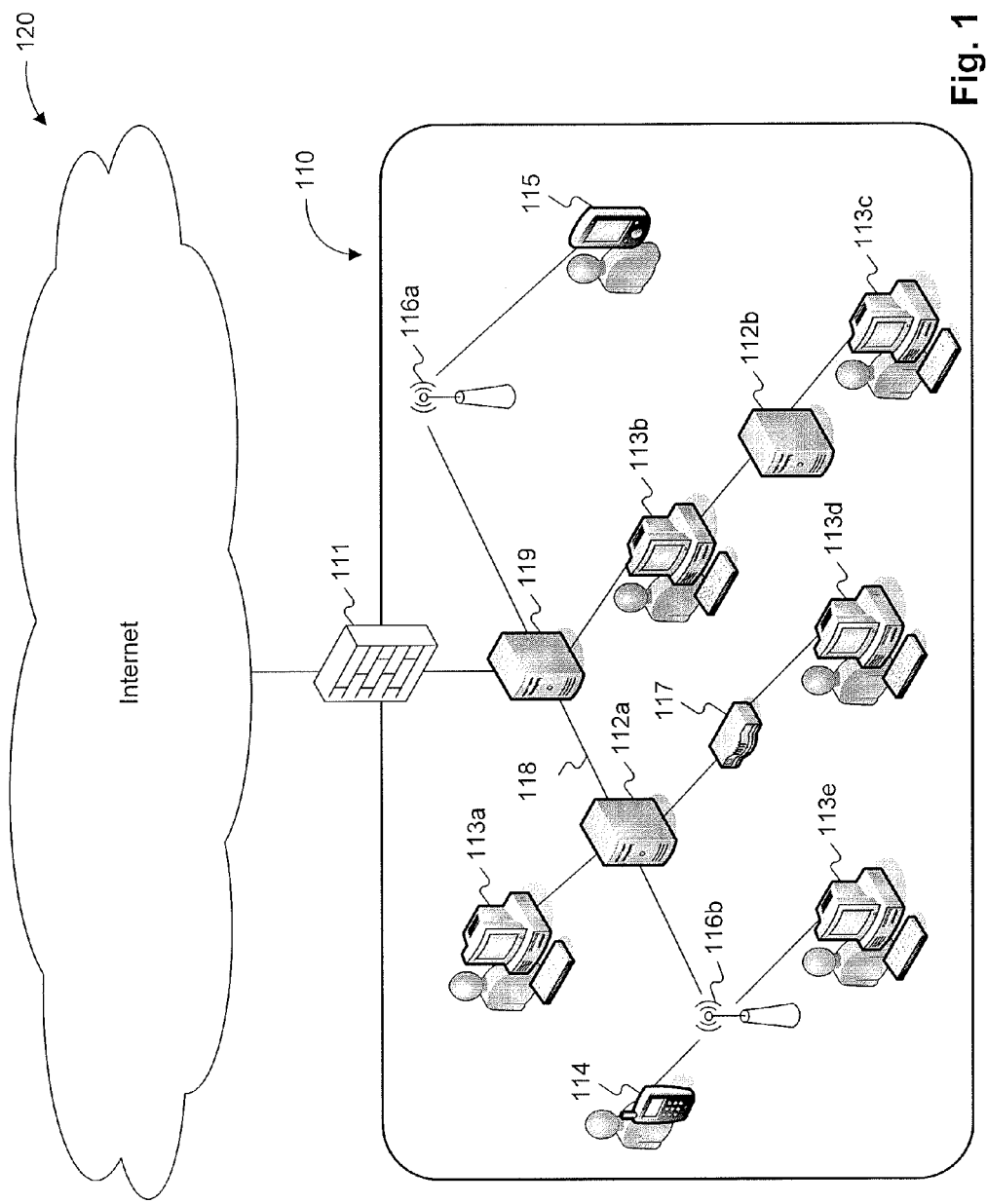
FIG. 1 is a diagram of an exemplary local network, consistent with certain disclosed embodiments.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

FIG. 1 is a diagram of an exemplary local network processing and storing data to be analyzed, consistent with certain disclosed embodiments. As shown in FIG. 1, network 110 may include one or more computers, e.g., user workstations 113a-113e; one or more servers, e.g., servers 112a-112b; one or more mobile devices, e.g., mobile phone 114 and/or personal digital assistant (PDA) 115. Each device in network 110 may be operatively connected with one or more other devices, such as by wired network cable, e.g., cat5 Ethernet cable 118; wireless transmission station, e.g., stations 116a-116b; network router, e.g., router 117, etc. It will be appreciated by those skilled in the art that many other types of electronic and analog devices may be included in network 110 or may be connected in different manners. It will also be appreciated by those skilled in the art that the devices in network 110 need not be physically collocated but may also be geographically spread across buildings, jurisdictional boundaries, and even foreign countries. Moreover, a given device may reside within multiple networks or may become part of a network only when certain programs or processes, such as a virtual private network, are operating. Communications between devices within network 110 and devices outside of the network, such as devices connected to the Internet 120, may first pass through or be subject to one or more security devices or applications, such as a proxy server 119 or firewall 111.

Figure 2:
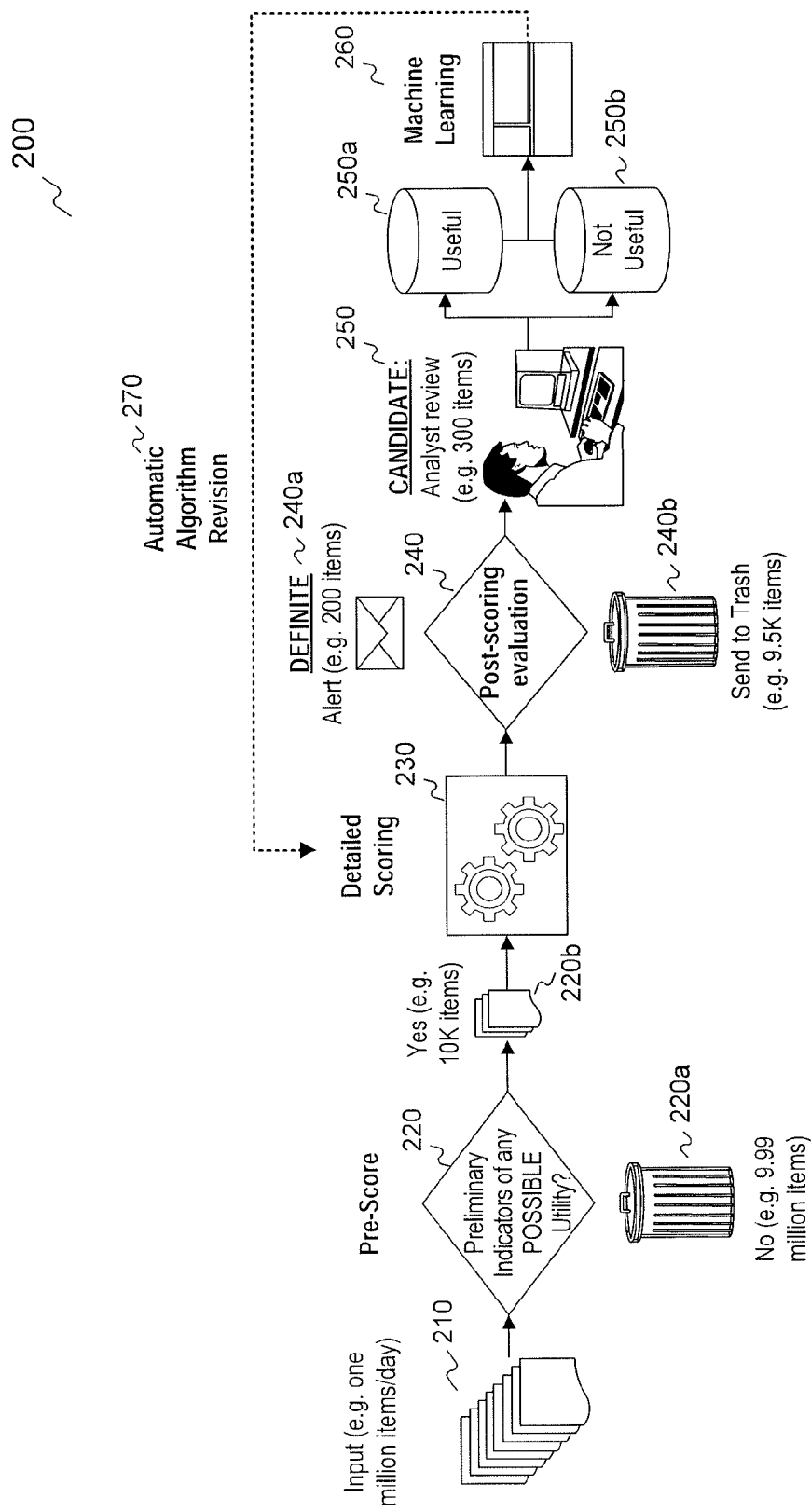
FIG. 2 is a diagram illustrating an exemplary system for collecting and processing large volumes of data to determine relevancy, consistent with certain disclosed embodiments.

FIG. 2 is an exemplary diagram illustrating an internal system for collecting and processing large volumes of data to determine relevancy, consistent with certain disclosed embodiments. In FIG. 2, system 200 processes large amounts of data 210 on a continual basis. Although depicted, for the sake of example, as "one million items/day," those skilled in the art will appreciate that the number of items processed by the system may vary over time. Moreover, system 200 may process items according to any given schedule, including periodic input operations, first-in-first out queuing, or waiting until a sufficient amount of data has been cached before inputting data in a batch-like fashion. System 200 may also receive data inputs from multiple sources in parallel.

In one embodiment, data 210 is received from processes or datastores within an intranet or local network 110. Although data may be collected or harvested from sources outside of the local network 110 by other processes or devices within the network 110, system 200 may be configured to input only data that has first been collected and stored within the network 110, rather than collecting any outside data itself.

During a pre-scoring phase 220, input data 210 may be evaluated against preliminary criteria to determine whether each data item contains any indicators of possible utility. In one embodiment, the process of collecting input data 210 also includes a process for normalizing the data as it is collected from processes or datastores within the network 110, such that all data items forwarded to the pre-scoring phase 220 are formatted according to an expected schema. Data items that do not contain any indicators (or a sufficient indication of) possible utility are discarded (220a), whereas data items that do meet such criteria are culled (220b) for additional analysis.

Depending on the configuration of the system, including the number and scope of data sources from which input data 210 is collected and the strictness of the preliminary exclusion criteria 220, the system may be able to significantly reduce the amount of data 220b subjected to additional analysis. In one embodiment, such preliminary criteria are formulated in advance of the pre-scoring phase 220 according to a particular topic for which relevant data items are being sought. The use of such preliminary relevancy criteria in the collection process represents an improvement over analyst systems that either do not subject input data to preliminary exclusion criteria or that rely on more generic preliminary exclusion criteria rather than criteria carefully tailored to the precise topic for which the input data is to be analyzed. Such systems are forced to rely primarily on the strength of post hoc search algorithms, which must operate over all collected data, regardless of relevancy, thus introducing significant performance burdens.

Data items 220b that are found to contain preliminary indicators of possible utility are then analyzed according to a number of algorithms designed to determine relevancy criteria, which criteria are then added to the data items as metadata. During a detailed scoring phase 230, each data item 220b may be evaluated for relevancy under a given topic and given a numerical score representing the likelihood that the data item is relevant under the topic. Such a score may be derived, for example, by assigning numerical weights for various characteristics that a hypothetical relevant data item may possess, quantifying the data item's metadata using the numerical weights, and summing the results to derive a single number. Those skilled in the art will appreciate that other techniques may be used to score a data item for relevancy using its metadata.

During a post-scoring evaluation phase 240, each data item 220b may be assessed for relevancy by comparing its score against various thresholds, such as an upper bound and a lower bound. Data items 240a having scores that exceed the upper bound may be determined to be relevant and may be forwarded to interested parties, such as analysts or decision-makers, by email, web interface, etc. Data items 240b having scores that fall below the lower bound may be determined to be not relevant and may be discarded.

Data items that neither exceed the upper bound nor fall below the lower bound may be regarded as potentially relevant or "candidates" and may be forwarded for manual review 250 by a human analyst. After manual review 250, the analyst may make an ultimate determination of which candidate items are relevant 250a and which candidate items are not relevant 250b. Relevant candidate items 250a may also be forwarded to interested parties, similar to items 240a. Non-relevant candidate items 240b may discarded.

In either case, however, the analyst's ultimate determination as to the relevance of a candidate data item may be fed, along with the candidate data item, into a machine learning process 260. During the machine learning process 260, the analyst's relevancy determination may be compared to the algorithms used to the score the candidate data item. For candidate data items that the analyst has determined to be relevant, the machine learning process may determine which algorithms could be modified to increase the likelihood that the same data item or similar data items would be positively identified as relevant in the future.

For example, if the machine learning process 260 determined that a relevant candidate data item had a high score on a particular attribute yet that attribute was weighted lightly in the detailed scoring phase, and if the machine learning process further determined that assigning a greater weight to that attribute would have resulted in a total score for the relevant candidate data item that would have exceeded the upper bound, the machine learning process may determine that greater weight should be assigned to that attribute. Likewise, if the machine learning process 260 determined that a non-relevant candidate data item had a high score on a particular attribute that was weighted strongly in the detailed scoring phase, and if the machine learning process further determined that assigning a lesser weight to that attribute would have resulted in a total score for the non-relevant candidate data item that would have fallen below the lower bound, the machine learning process may determine that lesser weight should be assigned to that attribute.

In either event, the results of the machine learning process may be used to revise the scoring algorithms according to an automatic revision process 270. Thereafter, subsequent data items 220b may be scored using the modified scoring algorithms for the purpose of obtaining a smaller percentage of scoring results that fall between the lower and upper bounds. In some embodiments, previously scored data items may also be re-scored using the modified scoring algorithms.

Form Factor Aspect

In some embodiments, system 200 may be implemented as a single, tightly-coupled hardware-software appliance solution. For example, software that performs the operations of system 200 may be installed on a single hardware bundle, such as a rack-mountable blade server or multi-blade server enclosure. The hardware bundle may include all hardware necessary to execute the software of system 200, including one or more computer processors; volatile, cache, and persistent memory modules or cards; peripheral and network interfaces and ports; etc. By installing and configuring all software necessary to implement system 200 on a single bundled hardware appliance, the hardware appliance may be distributed as a complete solution. This complete solution allows all configuration and software installation to be performed prior to distribution, so that a customer may receive a fully configured and operational appliance for rapid deployment and immediate use in analyzing data for relevancy.

Real-Time In-Memory Processing

Moreover, in some embodiments, most or all of the operations of system 200 may be performed completely in memory and in real time. Specifically, information from various data sources may be input into system 200 as soon as it is received. As all incoming data flows through system 200, it is temporarily stored in volatile memory, evaluated for relevancy in real-time, and, if determined to be non-relevant, discarded from memory in a stateless manner. Only information that is determined to be relevant may be stored in persistent memory. By processing all data in real time and entirely within volatile memory, system 200 may analyze arbitrarily large amounts of data without suffering any significant performance disadvantages. This aspect of the invention stands in contrast to traditional search tools, such as collect and search programs, which first either collect or index data in persistent memory before analyzing it, thus creating a situation in which performance is inversely proportional to the size of the data being analyzed.

Capturing Cognitive Thought Processes

Figure 3:
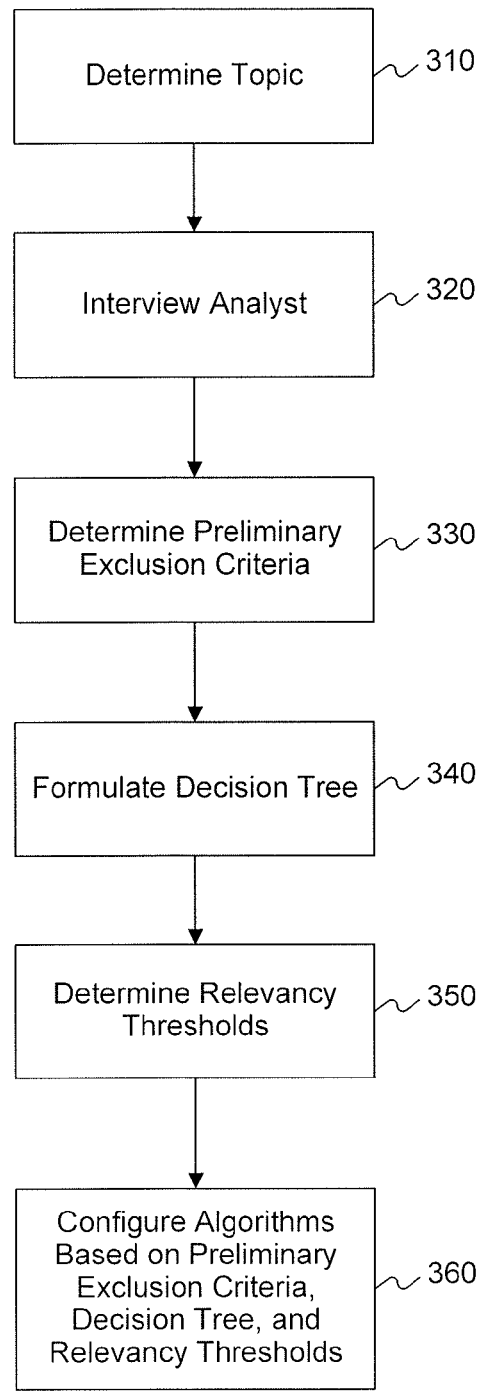
FIG. 3 is a flow diagram illustrating an exemplary method of configuring algorithms for data collection and processing using analyst input, consistent with certain disclosed embodiments.

FIG. 3 is an exemplary flow diagram illustrating a method of configuring algorithms for data collection and processing using analyst input, consistent with certain disclosed embodiments. As mentioned above, one aspect of the disclosed system is the formulation of topic and relevancy criteria and algorithms prior to at least part of the collection phase. By formulating these criteria and algorithms in advance, a significant amount of data may be screened out as non-relevant during early stages, thus requiring the system to perform more specific and resource-intensive analysis on a much smaller subset of more likely relevant data. As part of this initial configuration process, analyst input may be sought and used to configure various collection criteria and algorithms.

As depicted in FIG. 3, a topic may first be determined (step 310). In some embodiments, the topic may fall within one or all of the general compliance, intelligence, and intellectual property categories mentioned above. However, the scope of the topic is not so limited, but may be any topic for which data relevant to the topic is sought. As a running example, various following figures will focus on the topic of insider trading.

In step 320, an analyst is interviewed to assist in formulating computer algorithms for determining whether data may be related to the topic of insider trading. In step 330, the interview process may focus on developing preliminary exclusion criteria that may be used to screen out non-relevant data during early stages of collection and/or analysis. For example, if the goal is to identify data relevant to potential illegal insider trading within a company, the analyst may advise that academic articles or news stories discussing the broader topic of insider trading are likely not relevant, as they may discuss the issue only in the abstract rather than relate to potential instances of insider trading within the company. Therefore, exemplary preliminary exclusion criteria may be that any data items originating from academic or media sources are to be discarded during the collection process.

In step 340, the interview process is used to formulate a decision tree for evaluating whether a given data item may be relevant to the topic of insider trading. In one embodiment, the interview process may start along broad lines by asking the analyst general and open-ended questions about what he or she would look for in a data item to determine whether it is related to the topic of insider trading. In response, the analyst might give general answers, such as that the data item mentions "trading" or "insider trading"; the data item mentions the price of stock or shares; the data item mentions buying or selling stock or shares; the data item mentions a significant potential change within the company that could affect the company's share price, ownership, or leadership, or the value of other entities, securities, or commodities related to the potential change; the data item mentions or originates from a person within the company that either has the power to make high-level company decisions or is privy to information about such decisions; etc.

General criteria listed by the analyst may need to be broken down into more specific questions if the criteria could not be easily determined by computer operations. For example, it might be difficult to construct an algorithm that analyzes data for an answer to the generic question of whether a person mentioned in the data has the "power to make high-level company decisions." Therefore, the analyst may be further asked which kinds of personnel in a company he or she would classify under such a category, to which the analyst may list personnel such as directors, CEOs, presidents, vice presidents, CFOs, COOS, CIOs, etc. From this information, algorithms may be configured to perform string-matching operations to determine whether certain strings such as "director," "president," or "CEO" are found within a data item.

In other words, the interview process may comprise an iterative process by which the analyst's general or subjective criteria for determining whether a given data item is relevant to a particular topic may be reduced to a series of objective or binary questions that could be evaluated by a computer operating on textual or other data. Such simplified questions could then be organized into an assessment checklist, decision tree, or other evaluation engine for determining whether a given data item may be relevant to a particular topic in an automated manner meant to mimic the human analyst's thought processes. In some embodiments, subjecting data items to the resulting evaluation engine will result in a numerical or other quantified score for each data item that reflects the degree to which the data item is relevant to the topic according the analyst's logic.

In step 350, analyst input is sought for determining relevancy thresholds for scored data items. Such thresholds may include a lower bound, indicating that all data items having scores falling below the lower bound are to be deemed non-relevant, and an upper bound, indicating that all data items having scores above the upper bound are to be deemed relevant. Data items having scores falling between the upper and lower bounds may be deemed potentially relevant and subject to additional review, such as manual analyst review. In step 360, algorithms are created and/or configured based on the preliminary exclusion criteria, decision tree, and relevant thresholds determined from the analyst interview.

By employing the foregoing operations as part of the configuration process for evaluating relevancy for a given topic, it is possible to configure system 200 to function as an artificially intelligent appliance that is able to mimic the thinking process of a subject matter expert and to employ those thought processes throughout all stages of the relevancy evaluation. Those skilled in the art will appreciate that the steps illustrated in and described with respect to FIG. 3 are exemplary only. It will be appreciated that the operations described in these steps may be combined, separated, used in a different order, or repeated according to interactive inter-process communications in order to achieve similar ends.

Figure 4:
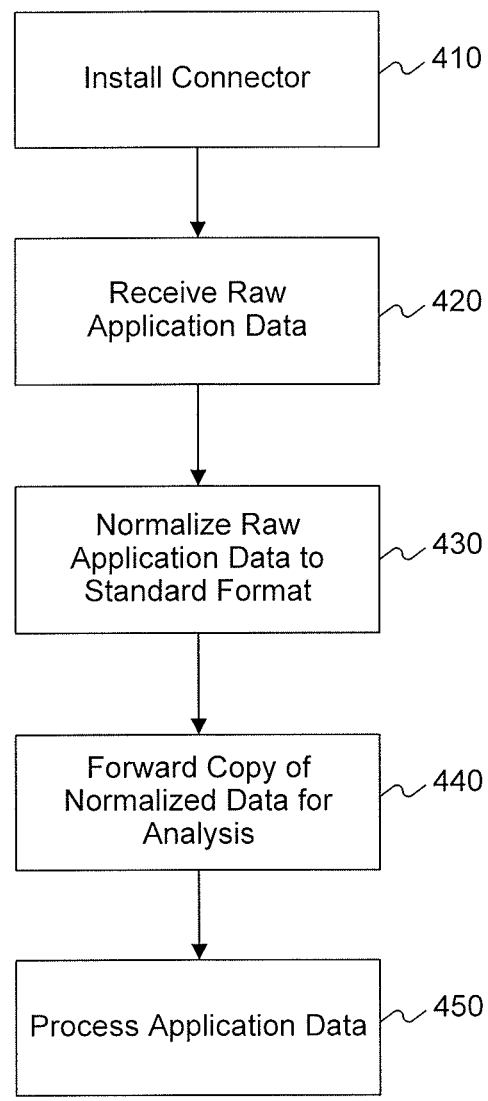
FIG. 4 is a flow diagram illustrating an exemplary method of collecting and normalizing data from heterogeneous sources, consistent with certain disclosed embodiments.

FIG. 4 is an exemplary flow diagram illustrating a method of collecting and normalizing data from heterogeneous sources, consistent with certain disclosed embodiments. One important aspect of the present invention is its ability to be deployed on-site and within the intranet that contains the data to be collected and analyzed by system 200. As a result, data may be obtained, processed, and analyzed all within the intranet environment such that no data need enter or leave the intranet. This technique of complete on-site deployment as a tightly coupled hardware-software solution solves several significant problems associated with operating the disclosed system as part of a hosted solution or an enterprise software solution deployed on-site.

For example, when utilizing hosted solutions for analyzing company or other organization information, the data to be analyzed must first be transferred or copied to an off-site location associated with the hosted solution. Since the amount of data to be analyzed might be very large, the transfer of large amounts of data from one enterprise to another may introduce significant performance issues. For example, whereas a direct serial connection may exist between devices resident within the organization's intranet, allowing for fast transfer of data between such intra-organization devices, data that is transferred between enterprises may often need to traverse over a shared medium, such as an Ethernet link, which may present varying degrees of bandwidth depending on other network traffic.

As another consideration, the transferring of data outside of the organization's intranet may introduce various security issues, such as the need for opening firewalls or issuing login credentials, and operates to render the organization's intranet and data less secure. Such security issues may be present even if the hosted solution provider is a trusted party and even if extra security measures, such as encrypting all transmitted data, are employed. Moreover, extra security measures, such as encryption, may also contribute to the performance drawbacks of a hosted solution, since performing encryption and decryption operations over large amounts of data may be operationally expensive.

In yet another example, even apart from the danger of a third party obtaining access to the data transferred to the hosted solution provider, there may be significant security issues associated with the provider's access to the analyzed data or the algorithms used to analyze that data. One particular use of the disclosed system may be to analyze terrorism, defense, or other threat information for national security purposes. Such information may be classified or subject to other restrictions on which persons may access it. These restrictions may not allow for access by otherwise trusted third-party vendors, even simply for data processing. Moreover, even if the hosted solution provider were permitted to access the data to be analyzed, there may be significant security concerns with the provider having access to the algorithms used to analyze that data, as such algorithms provide an insight into what kinds of information the organization is attempting to search for, which may be classified or secret information in and of itself.

Embodiments of the disclosed invention, therefore, overcome these and other problems associated with using hosted solutions for data analysis. In one embodiment, the disclosed invention contemplates implementing a complete on-site deployment for analyzing an organization's data through the use of one or more application-specific "connectors." These application-specific connectors forward application data either directly to analysis system 200 or to an intermediate datastore associated with system 200, all within the organization's intranet. Moreover, the typical types of problems that normally discourage enterprises, from employing sophisticated on-site solutions, such as the disclosed system 200, are greatly ameliorated by the form factor aspect of the present invention, by bundling all software and hardware functionality into a pre-configured and tightly coupled appliance capable of quick installation and rapid deployment.

Processing Structured, Semi-Structured, and Unstructured Data

The use of application-specific connectors, as further described below, is also effective for overcoming another problem inherent in the prior art—namely, the problem of analyzing data from heterogeneous data sources. Data sources typically fall within one of three different categories: structured data, semi-structured data, and unstructured data. Structured data may refer to data that is organized in such a manner that the function of any data may be readily determined by its location within the data source. For example, data within a relational database may be strictly organized, such that all data is segregated into individual table columns or fields that identify the function or meaning of the data. Unstructured data may refer to data that either follows no organizational structure or rules for determining its function or meaning or for which the nature of an existing structure is unknown. Examples include raw text files or text embedded within unknown file formats. Finally, semi-structured data may refer to data that shares properties of both structured and semi-structured data. For example, in some instances, XML content may be considered semi-structured data; although the XML tags provide a known organizational structure, content placed within the tags may be in unstructured form.

Each application from which data is forwarded for analysis may be unique in its structure or function, and may store, manipulate, or present data in any manner, including in a structured, semi-structured, or unstructured format. Such heterogeneous data sources may present considerable difficulties for applying uniform search and analysis algorithms across all data for traditional analyst systems. However, the disclosed application-specific connectors may be used to overcome this problem of lack of data-uniformity by standardizing or normalizing data collected from their associated applications in the course of collecting and forwarding the data.

For example, FIG. 5 is a diagram depicting an electronic message board containing internal communications, consistent with certain disclosed embodiments. Electronic message board 500 may be an interactive web program accessible by a particular personnel group within a company, such as a software engineering department, by which engineers might communicate technical, project-specific, or other company-related information. Electronic message board 500 may be implemented using an HTTP server program, such as Apache, for servicing HTTP requests; a relational database, such as MySQL, for storing message board posts; and a number of server-side scripts, such as Perl scripts, for implementing the functionality of a web message board using the Common Gateway Interface (CGI). The software for implementing these applications may reside on one or more server devices, and users may access the electronic message board using standard web browsers that both render HTML and process HTML forms. Because electronic message board 500 is primarily a web application, its application data (i.e., users posts and responses) would likely be formatted as either HTML-tagged text or as record entries within a database, thus utilizing both structured and semi-structured formats.

Figure 6:
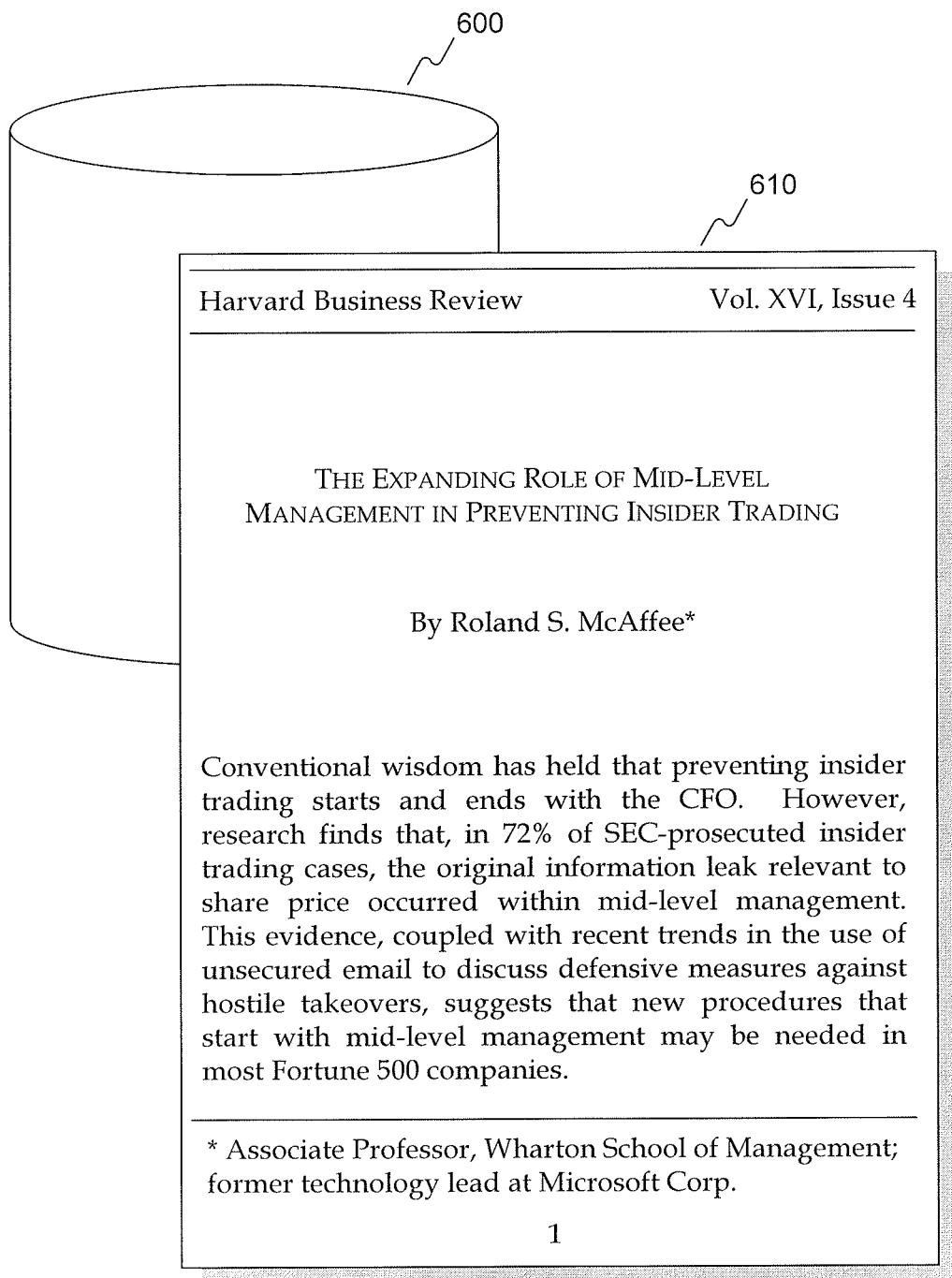
FIG. 6 is a diagram depicting an exemplary digital document stored within a content repository, consistent with certain disclosed embodiments.

As another example, FIG. 6 is a diagram depicting a digital document stored within a content repository, consistent with certain disclosed embodiments. Document 610 may be contained within a PDF, rich text, or type of file format and digitally stored within a document repository 600, such as EMC's Documentum® application or Interwoven's DeskSite® application. Unlike data processed by electronic message board 500, data stored within document repository 600 may not be represented by raw text or other human-readable characters. Rather, data residing within document repository 600 (e.g., documents, emails, images, etc.) may be stored in a proprietary binary format on disk that only processes within document repository 600 would be able to translate into human-readable text. Data residing within document repository 600 may therefore be in a semi-structured or unstructured format, depending on the file type or whether document repository is able to read or understand the file type.

The fundamentally different nature of the way that application data is processed and stored between electronic message board 500 and document repository 600 highlights one problem that is overcome by the present invention—namely, the problem of performing analysis over heterogeneous data, including structured, semi-structured, and unstructured data, from various different applications. The use of one or more application-specific connectors in the present invention overcomes this and other problems associated with data collection and analysis.

Figure 7:
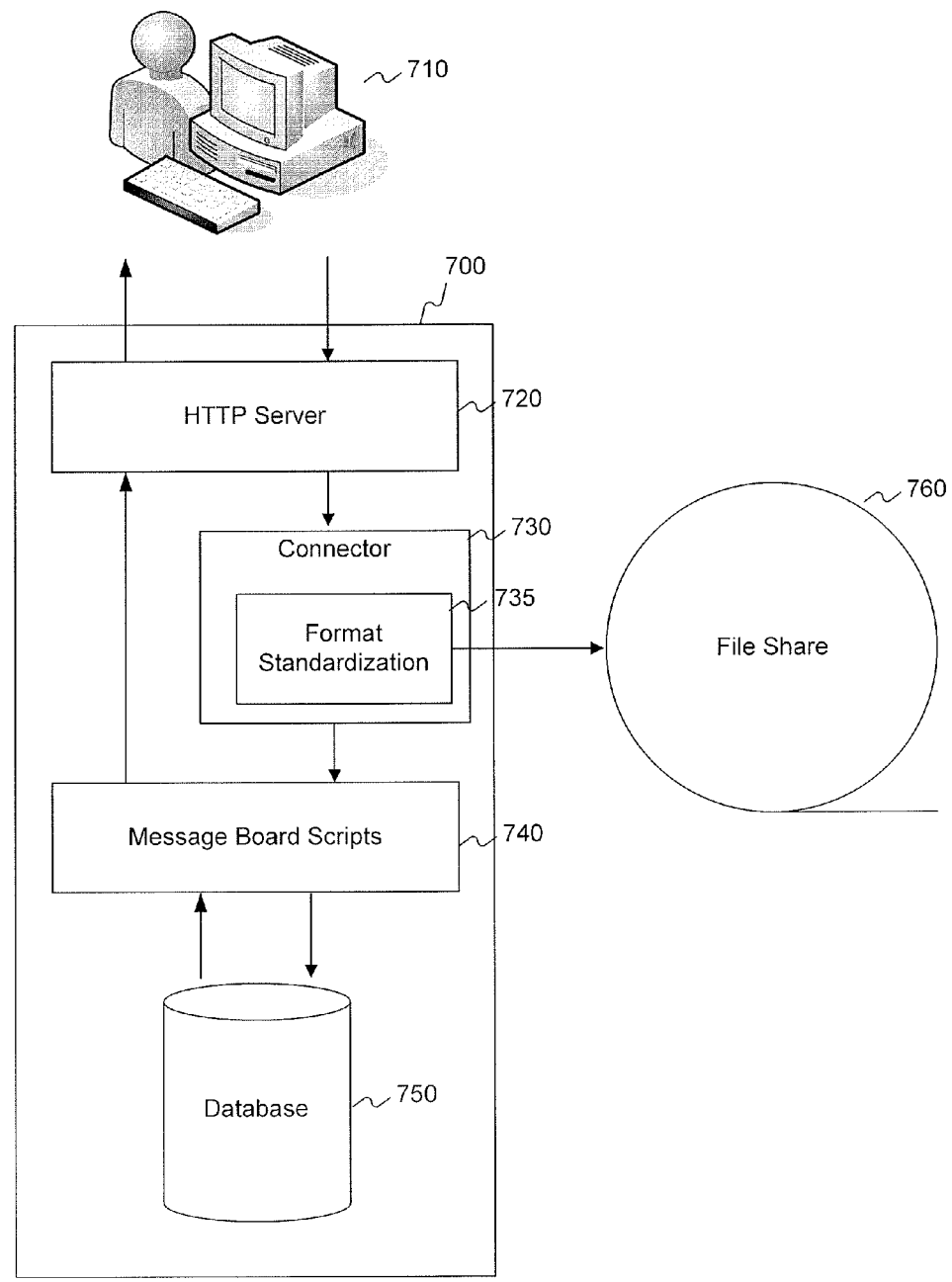
FIG. 7 is a diagram depicting an exemplary connector interfacing with the electronic message board of FIG. 5, consistent with certain disclosed embodiments.

In step 410, a connector is installed for interfacing with a particular application that processes or stores data that could be analyzed by system 200. The connector may be configured to obtain access to and/or copy data resident in the associated application (step 420). For example, FIG. 7 is a diagram depicting an exemplary connector interfacing with the electronic message board of FIG. 5, consistent with certain disclosed embodiments. As discussed above, in some embodiments electronic message board 500 may be implemented as an HTTP server 720, relational database 750, and a collection of server-side scripts 740, all which may reside and execute on a device 700, such as a dedicated server device.

A connector 730 may also be installed on device 700 for the purpose of obtaining access to data that passes through the electronic message board 500 while also allowing electronic message board 500 to otherwise function normally without any indication that application data is being monitored. Connector 730 may be, for example, a server-side script, an executable program file, a log-monitoring daemon, a dynamic link library (DLL) a plug-in, etc. The Apache HTTP server software, for example, provides several "hooks" that allow an administrator to intercept and modify an HTTP message as it is processed by the HTTP server using the "mod_perl" library. Connector 730 may, therefore, act as a gateway between HTTP server 720 and the collection of server-side scripts 740. Connector 730 may examine the content of incoming HTTP requests and may copy the contents of all HTTP requests or only the contents of HTTP requests matching certain criteria, etc.

In step 430, the connector may normalize any data that is to be forwarded for analysis. For example, the data processed and stored by electronic message board 500 may be formatted at different stages as raw HTTP header and payload data, as HTML text, or as database records, and thus as unstructured, semi-structured, or structured data. At any stage, however, the data of electronic message board 500 will likely be in a format optimized for the particular process in which the data is being manipulated rather than a format that is ideal for analysis by system 200. In certain embodiments, the connector may therefore cull only the relevant data from its associated application (e.g., non-system data) and organize that data into a standard format, such as an eXtensible Markup Language (XML) document structured according to an XML schema. For example, in FIG. 8a, message data 510 and 520 of electronic message board 500 is formatted into an XML document.

In other embodiments, document 610 may be stored in a completely proprietary binary format that is readable only by processes within document repository 600. Such binary data is also not optimized for analysis by system 200. Therefore, a connector resident within document repository 600 or on a device that is operating repository 600 (not shown), may access repository data, such as document 610, and re-format the data into a similar normalized structure, such as the XML document depicted in FIG. 8b.

In some embodiments the process of normalizing data by each connector may comprise converting structured, semi-structured, and unstructured data into a common semi-structured format, such as an XML document conforming to a particular XML schema. However, other types of normalization may also be utilized, including conversion to a common fully-structured format.

Once the relevant application data has been normalized by the connector, the normalized data may be forwarded for analysis (step 440). Although normalized data may be forwarded directly to analysis processes within system 200, in some embodiments, normalized data may first be forwarded to an intermediate file share, for example file share 760 in FIG. 7. The use of a file share may allow data to be collected and forwarded from various applications in an uninterrupted fashion while also allowing the analysis processes of system 200 to obtain new data for analysis from the file share at their own pace, for example using "pull" operations.

Finally, any intercepted or accessed application data may be forwarded or left unmodified by the connector so that it may be processed by the application in a normal fashion (step 450). For example, in FIG. 7, incoming HTTP requests may pass through connector 730. Connector 730 may copy all or a subset of the incoming HTTP request data, normalize the data, and forward it to file share 760. Connector 730 may then forward the HTTP requests (e.g., unmodified) to server-side scripts 740 for normal message board processing.

As depicted in FIG. 7, in some embodiments connector 730 may be configured to intercept only HTTP data flowing into message board 500, as outgoing HTTP responses may be considered administrative only or cumulative of data already collected. However, connector 730 could also be configured to intercept, analyze, copy, and forward outgoing HTTP messages as well. Those skilled in the art will appreciate other ways that connector 730 may integrate into electronic message board 500 to intercept and copy data. For example, connector 730 could reside between the more basic Transmission Control Protocol (TCP) operations of device 700 and HTTP server 720, could simply monitor network traffic through "packet-sniffing," or could itself be a custom-built HTTP server. In some embodiments, in may be preferable that connector 730 only connects to, rather than is a part of, the regular application processes associated with message board 500, since it may be desirable that connector 730 be installable and removable for any web application without necessitating any modifications to the web application.

Those skilled in the art will appreciate that connectors may interface with applications in a variety of ways while still accomplishing data collection. For example, rather than application data passing through a connector, a connector may have read-only access to the application data such that the application is able to process its data (step 450) without waiting for the connector to copy, normalize, and/or forward the application data (steps 420-440).

Figure 9:
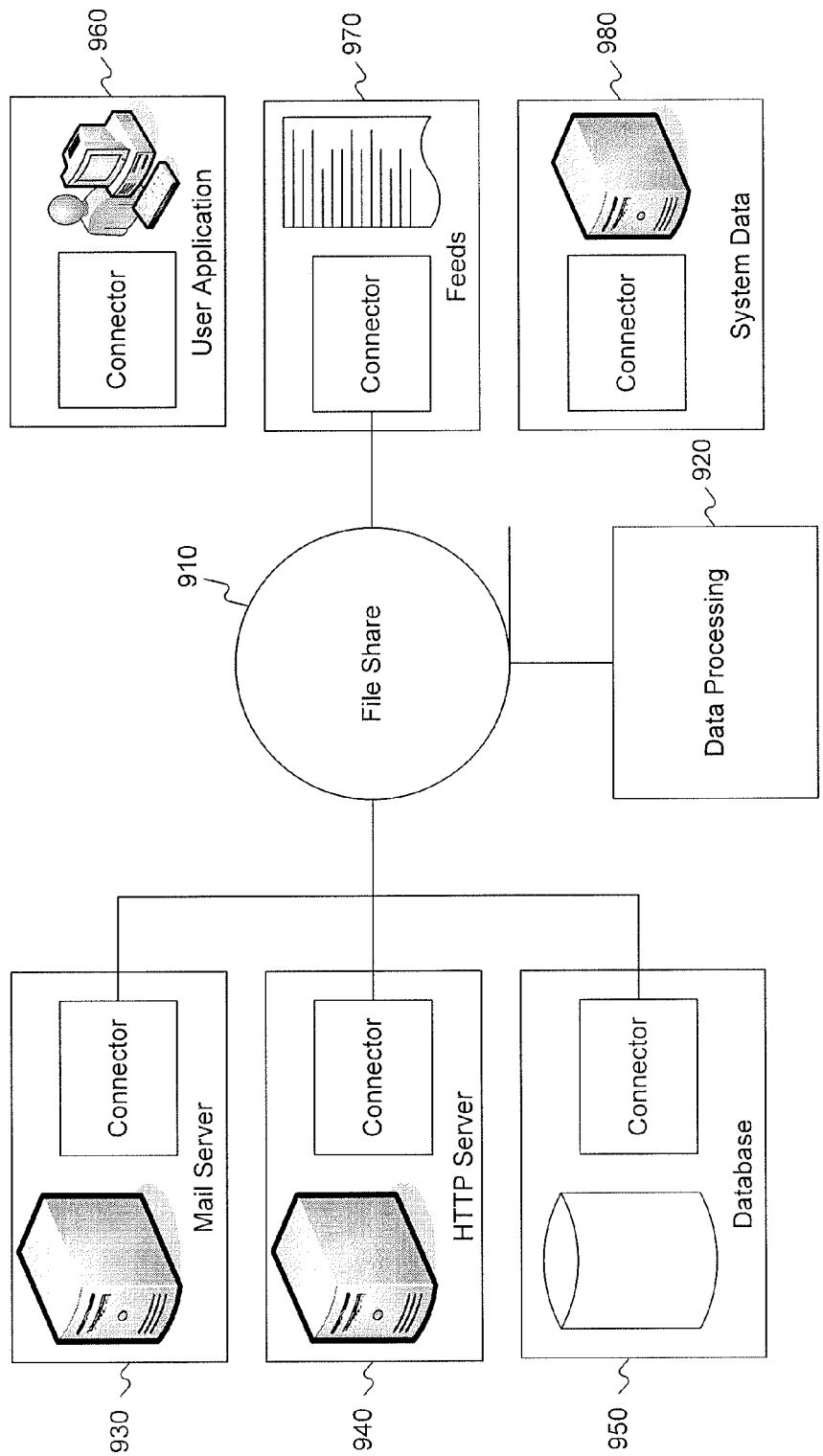
FIG. 9 is a diagram depicting an exemplary network of connectors, consistent with certain disclosed embodiments.

The foregoing techniques may be used to construct a connector to interface with essentially any application in order to collect that application's data for analysis. For example, as depicted in FIG. 9, individual connectors may be installed to interface with mail servers 930 in order to monitor email communications both within the organization and with persons or entities outside of the organization. Connectors may be installed to interface with HTTP servers 940 or associated web applications, for example, websites, message boards, wikis, blogs, Twitter tweets, SharePoint applications, etc. Connectors may be installed to interface with databases 950 or other types of datastores, such as content repositories, versioning systems, user or system hard drives, etc. Connectors may be installed to interface with user applications 960, such as chat programs, web browsing applications, RSS readers, office software, integrated development environments (IDEs), etc.

Although in some embodiments, system 200 may be configured to operate only on data resident within an intranet, rather than searching for or collecting outside data itself, system 200 may nevertheless analyze external data that is first collected by other processes or persons and stored within the intranet for collection by system 200. Such outside data may include various data feeds 970, such as diplomatic cables (e.g., private communications made by government officials, such as point-by-point discussions on meetings of embassy officials), security alerts, proprietary subscriptions, drones (e.g., tools for automatically running batch jobs of simulation programs), etc. Moreover, although previous examples have focused on semantic or other data that may originate from human sources, system 200 is not limited to analyzing any one kind of data, but may also be used to analyze system data 980, such as logs, hardware diagnostics, network traffic data, machine-created output, etc. Those skilled in the art will appreciate that the foregoing applications and sources of data are exemplary only.

Data from any such application or data source may be collected, normalized, and copied to file share 910. Processes within data processing system 920, which may analyze and score data as described with respect to system 200, may retrieve the collected data from file share 910 on an as-needed basis (e.g., using "pull" operations) or periodically (e.g., using "push" operations).

Figure 10:
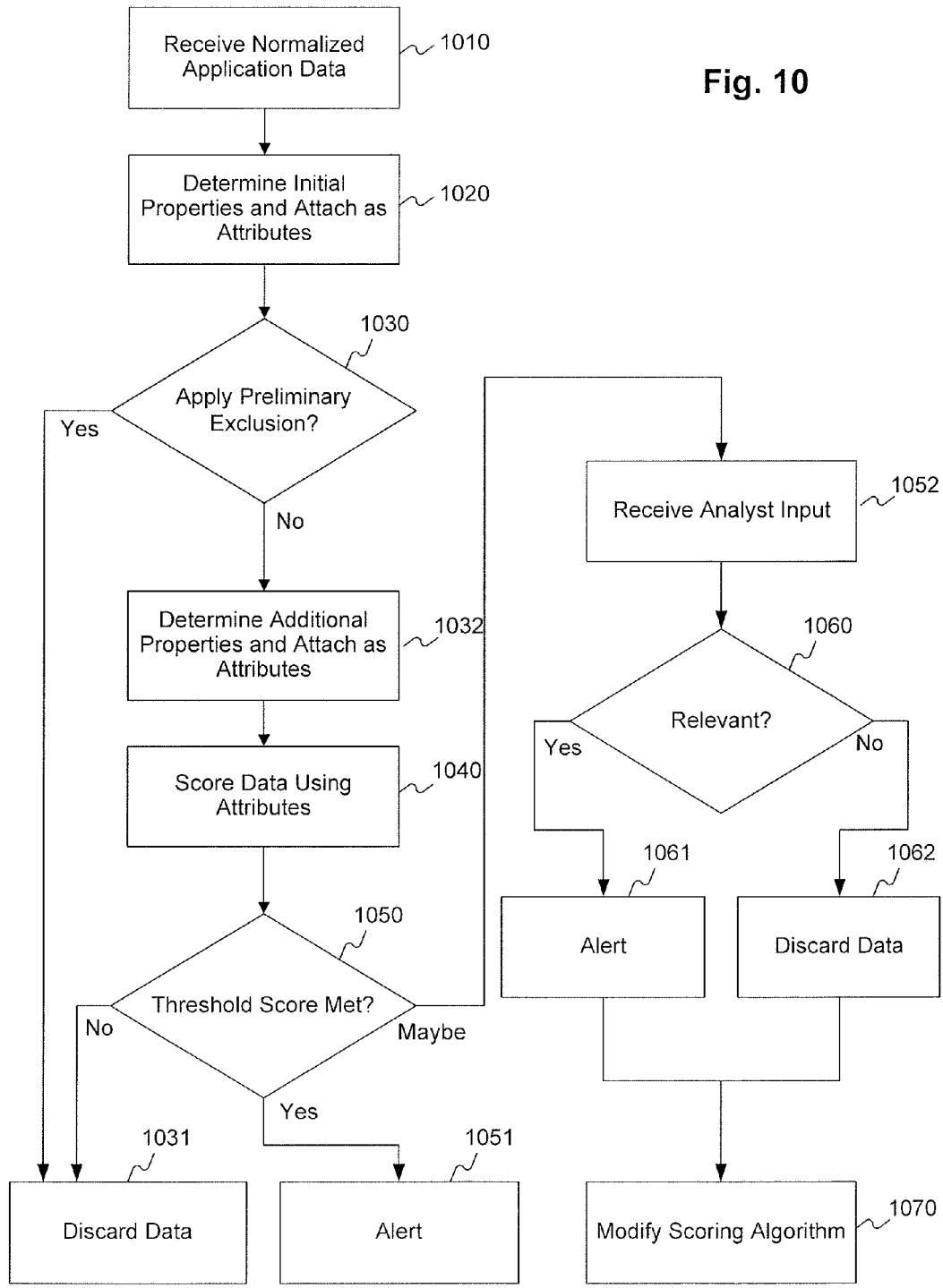
FIG. 10 is a flow diagram illustrating an exemplary method of analyzing and scoring input data, consistent with certain disclosed embodiments.

FIG. 10 is an exemplary flow diagram illustrating a method of analyzing and scoring input data, consistent with certain disclosed embodiments. In step 1010, the system may receive data from various sources, for example, from connectors interfacing with various applications and data sources. Such data may have been further normalized by the connectors and placed in a data store from which the system may request data as needed. In step 1020, the system determines a set of initial properties or metadata and attaches those properties as attributes to the data. Initial properties may include attributes that are true of the data when it arrives such as the original source and the language of the content.

In some embodiments, metadata may be stored within the normalized data item itself. For example, FIG. 11 depicts the normalized electronic message board data of FIG. 8a after step 1020. The XML of data item 1100 now includes a metadata section 1110, which includes an initial attributes subsection 1120. For example, initial attributes 1120 may include one or more dates 1121-1122, titles 1123, data source types 1124 and source names 1125, authors 1126-1127, custodians 1128, etc. Similarly, FIG. 12 depicts the normalized electronic document of FIG. 8b after step 1020.

At this point, the system may have enough information to make some preliminary exclusion determinations (step 1030), for example using the preliminary exclusion criteria derived in step 330 of FIG. 3. For example, if the designated topic for locating relevant data is potential insider trading within the company, then the system may be configured to exclude data items from academic journals, newspapers, or other media. The system may also be configured to exclude data items preceding a certain date or originating from certain custodians. Thus, for example, the system could decide to exclude data item 1200 since it has a source type 1223 of "Journal, Academic," in which case the data may be discarded (step 1031). Alternatively, the system could decide to not exclude data item 1200 since it has a custodian 1226 who is in executive management within the company.

If the data item is not excluded, the data proceeds to a pre-scoring phase during which additional properties of the data item may be determined and attached as attributes (step 1032). In some embodiments, the properties are determined by analyzing the data to answer a series of questions about the data, such as the questions derived in step 340 of FIG. 3. For example, such questions may include whether and to what degree the data contains various keywords that the analyst has identified as commonly found in insider-trading communications, such as "share," "deal," or "takeover." If the company is currently in negotiations for acquisition by another company, for example Microsoft, then additional situation-specific keywords may include "microsoft" and "ms." Such inquiries may use various wildcard, regular expression, truncation, or lemmatization techniques to ensure nuanced keyword searches that return matches in spite of slight variations in tense, derivations, spelling, or syntax.

The answers to the these questions may be stored in a set of derived attributes within the modified normalized data item. For example, FIG. 13 depicts the data item of FIG. 11 after step 1032. The answers to the keyword inquiries described above are stored in a set of XML tags 1331-1335 within a derived attributes section 1330 of the metadata section 1110. For example, attributes 1331-1335 specifying the "kw" namespace may provide a number representing the number of occurrences of the relevant keyword.

The questions may also include proximity evaluations 1336, such as whether the word "inside" occurs within five words of the word "trade." The questions may also include any number of more nuanced inquiries 1337, such as whether the data mentions any company executive. Those skilled in the art will appreciate that the data may be analyzed and queried in any way to derive answers to any questions that are capable of answer via textual or electronic analysis. The answers to questions may be stored as metadata within the data item and may be represented numerically, textually, by formula, or by any other means. FIG. 14 similarly depicts the data item of FIG. 12 after step 1032.

After the relevant questions have been asked of the data item and the answers to those questions have been stored as metadata, the data item proceeds to a detailed scoring phase. In step 1040, the data item is scored according to the values of its attributes to derive a single numerical score. In some embodiments, the attributes may be stored as numbers, and the scoring may comprise multiplying each of the attributes by an assigned weight and adding all of the weighted attributes together. However, those skilled in the art will appreciate that the score may be derived in any manner. Moreover, the derived score need not be numerical or one-dimensional, but may be any kind of symbol or formula that may be used to quantify or assign one or more values to the data item as a whole.

In step 1050, the data item is compared against a threshold score. If the data item's score does not meet a lower bound (step 1050, no), the data may be discarded (step 1031). If the data item's score meets or exceeds an upper bound (step 1050, yes), the data item may be considered relevant to the topic and may be treated as such, for example, by sending an alert about the data item (step 1051). If the data item neither falls below the lower bound nor meets or exceeds the upper bound (step 1050, maybe), the data item may be forwarded for manual review, such as by an analyst (step 1052).

The analyst may review the data item in any manner, for example, using a desktop or web interface, and may view any and all information about the data item, for example, its payload, original source and formatting, metadata, etc. The analyst station may also be equipped with a number of tools or resources that the analyst may use to further determine whether the data item is relevant to the topic. The analyst may enter his or her final determination as to whether the data item is relevant into the system, and may also enter any additional information about the data item or about his or her analysis.

If the analyst designates the data item relevant (step 1060, yes), the data item may be forwarded to appropriate persons or processes, for example, by alert (step 1061). If the analyst designates the data item as non-relevant (step 1060, no), the data item may be discarded.

In step 1070, the analyst's determination about the relevancy of the data item, as well as additional information the analyst may have provided, may be used to modify the scoring algorithm so as to ensure proper classification in the future. That is, if the analyst designates that data item relevant, the scoring algorithm may be revised so that the same data item would be automatically marked as relevant (e.g., would score above the upper bound) in the future, and if the analyst designates the data item non-relevant, the scoring algorithm may be revised so that the same data item would be automatically marked as non-relevant (e.g., would score below the lower bound) in the future.

Figure 15:
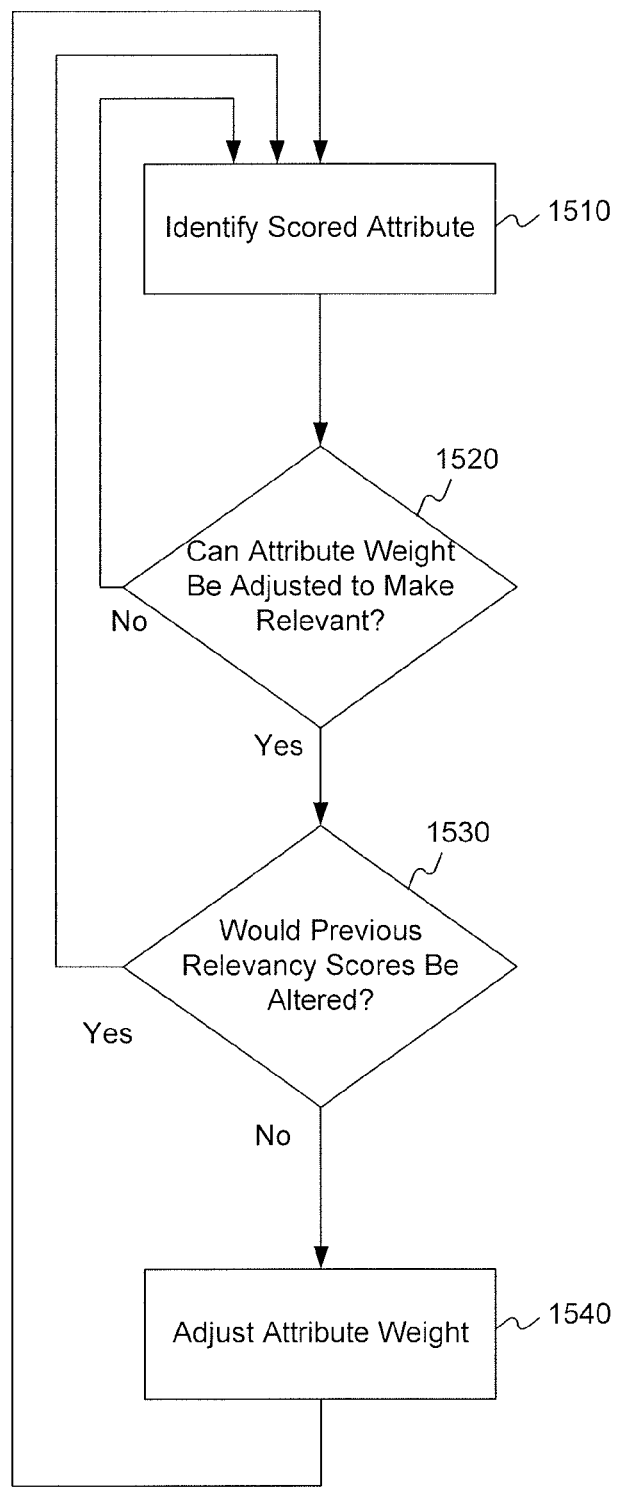
FIG. 15 is a flow diagram illustrating an exemplary method of modifying one or more scoring algorithms in response to analyst input, consistent with certain disclosed embodiments.

FIG. 15 is an exemplary flow diagram illustrating a method of modifying one or more scoring algorithms, consistent with certain disclosed embodiments. One exemplary technique for revising a scoring algorithm works by examining each scored attribute in the data item and determining whether the weight assigned to that attribute in the scoring algorithm may be adjusted without altering previous relevancy determinations. In step 1510, the system identifies an attribute that was scored for the data item. This attribute may be identified in response to analyst input about why he or she found the data item relevant. For example, the analyst may indicate that the fact that data item 1200 had an executive custodian 1226 was important to the analyst's determination yet was not weighted heavily by the scoring algorithm. Alternatively, the system may simply iterate through each of the scored attributes in an automatic fashion.

In step 1520, the system attempts to determine whether the weight assigned to that attribute could be adjusted (e.g., increased) such that the adjusted weight would result in a relevant score for the data item if rescored. However, such an adjustment might be advantageous only if it resulted in more accurate scoring for that data item and similar data items without disturbing results for other data items, such as previously scored data items. Thus, the system might first see whether such an adjustment would disturb previous relevancy scores (step 1530). If the adjustment would not result in disturbing previous scores, then the weight may be so adjusted (step 1540). If the adjustment would disturb previous scores, then the weight may be left in tact and the process may proceed with analyzing another attribute (1510). Those skilled in the art will appreciate that there may be other (e.g., more complex or iterative) techniques for automatically revising the relevant scoring algorithms in response to analyst input. For example, rather than adjusting weights, the system may modify the questions that are being asked to score the data item. For example, rather than asking whether the text "inside" occurs within five words of the text "trade," as per attribute 1336, the system may change the degree of proximity to three words.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

The invention claimed is:

1. A computer-implemented method of analyzing data in a local network to determine relevance to a topic, the method comprising:

deploying one or more data retrieval modules to interface with one or more data sources within the local network, wherein the one or more data retrieval modules comprise executable program code;

executing the one or more data retrieval modules to perform operations comprising:
  accessing application data representing data stored or communicated through the one or more data sources;
  converting the application data into a normalized format; and
  forwarding the normalized application data for analysis; and analyzing the forwarded application data to determine whether it is relevant to the topic, wherein the analyzing is performed by one or more devices within the local network, the analyzing comprising:
  calculating one or more relevancy scores for the forwarded application data;
  classifying as relevant forwarded application data having scores above a first threshold;
  classifying as non-relevant forwarded application data having scores below a second threshold, wherein the second threshold is lower than the first threshold;
  classifying as review-pending forwarded application data having scores between the first threshold and the second threshold;
  forwarding the review-pending forwarded application data to one or more analysts;
  receiving input from the one or more analysts as to whether at least a portion of the forwarded review-pending application data is relevant; and
  modifying one or more automated algorithms used for determining relevance based on the input from the one or more analysts.

2. The method of claim 1, wherein deploying the one or more data retrieval modules further comprises:
  installing the one or more data retrieval modules on one or more devices executing processes associated with the one or more data sources.

3. The method of claim 1, wherein forwarding the application data for analysis further comprises:
  forwarding the application data to an intermediate datastore, the datastore providing the forwarded application data to one or more processes analyzing the forwarded application data for relevance on a periodic or as-needed basis.

4. The method of claim 1, wherein the application data comprises structured, semi-structured, and unstructured data, and wherein converting the application data into a normalized format comprises converting the structured, semi-structured, and unstructured data into a semi-structured format.

5. The method of claim 1, wherein calculating one or more relevancy scores for the forwarded application data further comprises:
  analyzing the forwarded application data to determine one or more answers to one or more questions about the forwarded application data;
  generating a first set of metadata about the forwarded application data based on the one or more answers; and
  calculating the one or more relevancy scores for the forwarded application data based on the first set of metadata.

6. The method of claim 5, further comprising:
  excluding forwarded application data satisfying one or more preliminary exclusion criteria prior to calculating one or more relevancy scores for the forwarded application data.

7. The method of claim 6, further comprising:
generating a second set of metadata about the forwarded application data based on one or more properties of the forwarded application data; and
determining whether the forwarded application data satisfies the one or more preliminary exclusion criteria based on the second set of metadata.

8. The method of claim 6, wherein one or more of the preliminary exclusion criteria, the one or more questions, the first threshold, and the second threshold are configured based on analyst input.

9. The method of claim 8, wherein the one or more of the preliminary exclusion criteria, the one or more questions, the first threshold, and the second threshold are configured based on analyst input such that application data subjected to the one or more of the preliminary exclusion criteria, the one or more questions, the first threshold, and the second threshold is classified as relevant or non-relevant based on how the analyst would classify the application data if performing manual review.

10. The method of claim 1, wherein all steps are performed in real-time, and wherein application data is maintained in volatile memory until classified as relevant.

11. A system for analyzing data in a network to determine relevance to a topic, the system comprising:
an application system comprising one or more devices within the network configured to operate one or more data sources, wherein the one or more devices are additionally configured to execute one or more data retrieval modules, the data retrieval modules configured to:
access application data representing data stored or communicated through the one or more data sources;
converting the application data into a normalized format; and
forwarding the normalized application data for analysis; and
an analysis system comprising one or more devices within the network configured to analyze the forwarded application data to determine whether it is relevant to the topic, the analysis system is configured to:
calculate one or more relevancy scores for the forwarded application data;
classify as relevant forwarded application data having scores above a first threshold;
classifying as non-relevant forwarded application data having scores below a second threshold, wherein the second threshold is lower than the first threshold;
classify as review-pending forwarded application data having scores between the first threshold and the second threshold;
forward the review-pending forwarded application data to one or more analysts;
receive input from the one or more analysts as to whether at least a portion of the forwarded review-pending application data is relevant; and
modify one or more automated algorithms used for determining relevance based on the input from the one or more analysts.

12. The system of claim 11, further comprising:
a datastore system comprising one or more devices within the network configured to receive forwarded application data from the one or more data retrieval modules and provide the forwarded application data to the analysis system.

13. The system of claim 11, wherein the application data comprises structured, semi-structured, and unstructured data, and wherein converting the application data into a normalized format comprises converting the structured, semi-structured, and unstructured data into a semi-structured format.

14. The system of claim 11, wherein calculating one or more relevancy scores for the forwarded application data further comprises:
analyzing the forwarded application data to determine one or more answers to one or more questions about the forwarded application data;
generating a first set of metadata about the forwarded application data based on the one or more answers; and
calculating the one or more relevancy scores for the forwarded application data based on the first set of metadata.

15. The system of claim 14, wherein analyzing the application data to determine whether it is relevant further comprises:
excluding forwarded application data satisfying one or more preliminary exclusion criteria prior to calculating one or more relevancy scores for the forwarded application data.

16. The system of claim 15, wherein analyzing the application data to determine whether it is relevant further comprises:
generating a second set of metadata about the forwarded application data based on one or more properties of the forwarded application data; and
determining whether the forwarded application data satisfies the one or more preliminary exclusion criteria based on the second set of metadata.

17. The system of claim 15, wherein one or more of the preliminary exclusion criteria, the one or more questions, the first threshold, and the second threshold are configured based on analyst input.

18. The system of claim 17, wherein the one or more of the preliminary exclusion criteria, the one or more questions, the first threshold, and the second threshold are configured based on analyst input such that application data subjected to the one or more of the preliminary exclusion criteria, the one or more questions, the first threshold, and the second threshold is classified as relevant or non-relevant based on how the analyst would classify the application data if performing manual review.

19. The system of claim 11, wherein all operations performed by the analysis system are performed in real-time, and wherein application data is maintained in volatile memory in the analysis system until classified as relevant.

20. The system of claim 19, wherein all operations performed by the analysis system are performed by software installed on and executing on a single hardware bundle.

21. A computer-implemented method of analyzing data in a network to determine relevance to a topic, the method comprising:
deploying one or more data retrieval modules to interface with one or more data sources within the network, wherein the one or more data retrieval modules comprise executable program code;
executing the one or more data retrieval modules to perform operations comprising:
accessing application data representing data stored or communicated through the one or more data sources;
converting the application data into a normalized format; and
forwarding the application data for analysis; and
analyzing the forwarded application data to determine whether it is relevant to the topic, wherein the analyzing is performed by one or more devices within the network, the analyzing comprising:

excluding forwarded application data satisfying one or more preliminary exclusion criteria;
analyzing the forwarded application data to determine one or more answers to one or more questions about the forwarded application data;
generating a set of metadata about the forwarded application data based on the one or more answers;
calculating one or more relevancy scores for the forwarded application data based on the first set of metadata;
classifying as relevant forwarded application data having scores above a first threshold;
classifying as non-relevant forwarded application data having scores below a second threshold, wherein the second threshold is lower than the first threshold;
classifying as review-pending forwarded application data having scores between the first threshold and the second threshold;
forwarding the review-pending forwarded application data to one or more analysts;
receiving input from the one or more analysts as to whether the review-pending forwarded application data is relevant; and
modifying one or more automated algorithms used for determining relevance based on the input from the one or more analysts.

* * * * *

UNITED STATES PATENT AND TRADEMARK OFFICE
CERTIFICATE OF CORRECTION

PATENT NO. : 8,484,217 B1
APPLICATION NO. : 13/045028
DATED : July 9, 2013
INVENTOR(S) : Manoj Kumar Srivastava et al.

Page 1 of 1

It is certified that error appears in the above-identified patent and that said Letters Patent is hereby corrected as shown below:

In the Claims

Claim 20, Col. 18, Line 49, "executing" should read as --executed--.

Signed and Sealed this
Twenty-fourth Day of September, 2013

Teresa Stanek Rea
*Deputy Director of the United States Patent and Trademark Office*